Aug. 21, 1962
P. F. T. C. STILLWELL
3,050,724
AMPLIFYING ARRANGEMENTS
Filed Nov. 29, 1957
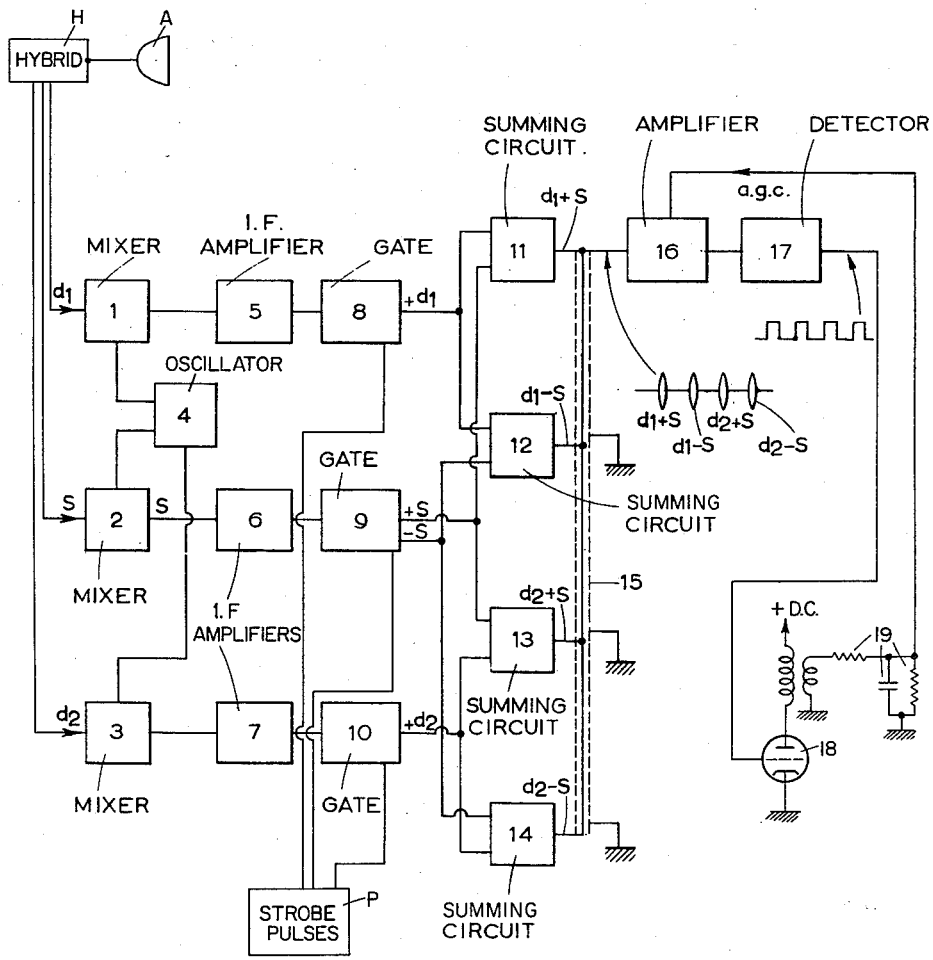
Inventor
P.F.T.C. Stillwell
By Glascock Downing Seeble
Attys.

3,050,724
AMPLIFYING ARRANGEMENTS
Peter Frederic Thomas Cryer Stillwell, Haddenham, Aylesbury, England, assignor to Electric & Musical Industries Limited, Middlesex, England, a company of Great Britain
Filed Nov. 29, 1957, Ser. No. 699,574
Claims priority, application Great Britain Dec. 4, 1956
3 Claims. (Cl. 343—16)

This invention relates to amplifying arrangements and has particular reference to such arrangements for use in radar apparatus.

In radar apparatus it is often required to amplify a plurality of trains of electrical signals each train comprising signals occurring at spaced time intervals with the signals in each train occurring coincidentally with the signals in another train. Such a problem arises in auto-following radar apparatus of the so-called simultaneous lobing type. Such apparatus may comprise a paraboloid irradiated by four feeders which are disposed symmetrically about the focus of the paraboloid so that each has a "squinted" polar diagram whilst their combined polar diagram is axial and symmetrical. It is possible to obtain from such an arrangement a sum signal and two difference signals at radio frequency which are a measure of the angular displacement of a target about two perpendicular axes. From these sum and difference signals it is necessary to obtain signals proportional to the difference signals divided by the sum signal. This can be effected by amplifying the three trains of signals in separate intermediate frequency amplifiers and then detecting the difference signals in suitably arranged phase-sensitive detectors. The final direct current signals then afford the angular error information correct both in amplitude and sign providing the three separate intermediate frequency amplifiers are automatically controlled in gain accurately from the sum signal. However, a difficulty arises in manufacturing three identical amplifiers having identical automatic gain control characteristics over the required range. Such problem might be solved by delaying the sum and difference signals relatively to one another and then amplifying the signals in a common amplifier. However, such an arrangement is not altogether satisfactory owing to the fact that if multiple echoes are received separated in range by a distance corresponding to the delay period the signals from desired echoes become confused with signals from undesired echoes. Similar difficulties may also arise where it is desired to amplify a plurality of trains of electrical signals and where the problems similar to those discussed may be present.

The object of the present invention is to provide an improved radar apparatus which serves to overcome or reduce the above mentioned difficulties.

According to the invention in radar apparatus of the simultaneous loading type there is provided a source of a plurality of trains of radar signals in which each train comprises signals occurring at spaced time intervals with the signals in each train occurring substantially coincidentally with the signals in another train, the signals in one train representing a difference signal $d_1$, the signals in another train representing a difference signal $d_2$, and the signals in another train representing a sum signal S, means for gating said signals so as to pass substantially coincidentally occurring gated signals from each train, means for deriving from said gated signals, composite signals representing $d_1+S$, $d_1-S$, $d_2+S$ and $d_2-S$, means for delaying said composite signals relatively to one another to cause composite signals derived from one group of coincidentally occurring gated signals to occur in succession before the occurrence of composite signals derived from the next group of coincidentally occurring gated signals, a common amplifier, and means for feeding the relatively delayed signals to said common amplifier. The amplifier to which the gated signals are fed can be a high gain amplifier and since all the gated signals from the respective trains are amplified by said common amplifier differences which might arise if said trains were amplified in separate amplifiers are substantially overcome. It will of course be appreciated that since the signals are gated, the gating apparatus may be such that the gated signals lie within a predetermined range so that the signals from desired echoes cannot be confused with signals from undesired echoes.

In order that the said invention may be clearly understood and readily carried into effect it will now be more fully described with reference to the accompanying drawing which illustrates diagrammatically one embodiment of the invention.

The invention will be described as applied by way of example to a simultaneous lobing radar receiving system. In the arrangement shown in the drawing three trains of radio frequency signals are employed representing a difference signal $d_1$, a sum signal S and a difference signal $d_2$ which may be derived from a suitable hybrid arrangement H disposed close to the receiving aerial A of the radar system. These signals are respectively fed to mixing circuits 1, 2 and 3 where the signals are mixed with oscillations from a common local oscillator 4 to provide intermediate frequency signals, these signals being fed to separate intermediate frequency amplifiers 5, 6 and 7 which have equal gains and are designed to raise the signals to a level only clear of noise. Such separate amplifiers can readily be designed. Each amplifier 5, 6 and 7 is connected respectively to a gating circuit 8, 9 and 10 which gate the low level signals and each of which is arranged to pass only signals occurring at a range selected by the normal range tracking or strobe circuits by being pulsed by pulses derived from the latter circuits indicated at P. The signals passed by the gating circuits 8 and 10 are the difference signals $d_1$ and $d_2$ while the gating circuit 9 is arranged to pass the sum signal S and is also arranged to generate a sum signal $-S$ these signals corresponding to echoes lying within the range selected by the range strobe. The output of the gating circuit 8 is fed to summing circuits 11 and 12, the sum signals $+S$ and $-S$ from the gating circuit 9 being also fed respectively to the summing circuits 11 and 12. The output of the gating circuit 10 is fed to summing circuits 13 and 14, the sum signals $+S$ and $-S$ from the gating circuit 9 being also fed respectively to the summing circuits 13 and 14 so as to provide four separate trains of signals $d_1+S$, $d_1-S$, $d_2+S$ and $d_2-S$. Each train comprises signals occurring at spaced time intervals with the signals in each train occurring coincidentally with the signals in another train.

Gating circuits 8, 9 and 10 may be of any well known type including one or more thermionic valves which are arranged to pass signals when said valves are switched by pulses as a foresaid, the pulses serving to render the valves operative to pass signals at instants when said pulses are present and to prevent the passage of signals when the pulses are not present. The gating circuit 9 may be arranged to provide a sum signal $+S$ and $-S$ by having in the output circuit thereof a centre tapped transformer across which signals $+S$ and $-S$ are set up.

The output from the circuits 11, 12 and 13 and 14 are then fed to a delay line 15 where they are mixed so that the signals in the respective trains are interspersed between the signals in another train so that all the signals in the trains become time sequential with equal time intervals. The signals from the delay line 15 are then fed to a common amplifier 16 and amplified. The amplifier 16 which is a high gain amplifier thus serves to amplify all the four sets of signals. After detection in a detector 17 the angular error signals can be obtained by comparing $|d_1+S|$ and $|d_1-S|$ and by comparing $|d_2+S|$ and $|d_2-S|$. The angular error signals can then be used for the control of servo motors operating the aerial of the radar apparatus.

It will be appreciated from the above that the signals which are fed to the delay line 15 convey information by virtue of their amplitude and hence the delay line 15 will not introduce ambiguity such as might occur if the signals fed thereto conveyed information as a result of differences in timing.

Automatic gain control may be applied to the amplifier 16, the gain control potentials being derived from the sum of all of the signals obtained after the detector 17. For example the signals from the detector 17 may be fed to the control electrodes of a valve 18 having in its output a suitable time constant circuit indicated at 19 from which gain control potentials can be derived for feeding to the amplifier 16.

What I claim is:

1. In radar apparatus of the simultaneous lobing type, a source of a plurality of trains of radar signals in which each train comprises signals occurring at spaced time intervals with the signals in each train occurring substantially coincidentally with the signals in another train, the signals in one train representing a difference signal $d_1$, the signals in another train representing a difference signal $d_2$, and the signals in another train representing a sum signal S, means for gating said signals so as to pass substantially coincidentally occurring gated signals from each train, means for deriving from said gated signals, composite signals representing $d_1+S$, $d_1-S$, $d_2+S$ and $d_2-S$, means for delaying said composite signals relatively to one another to cause composite signals derived from one group of coincidentally occurring gated signals to occur in succession before the occurrence of composite signals derived from the next group of coincidentally occurring gated signals, a common amplifier, and means for feeding the relatively delayed signals to said common amplifier.

2. In radar apparatus of the simultaneous lobing type, a source of a plurality of trains of radar signals in which each train comprises signals occurring at spaced time intervals with the signals in each train occurring substantially coincidentally with the signals in another train, the signals in one train representing a difference signal $d_1$, the signals in another train representing a difference signal $d_2$, and the signals in another train representing a sum signal S, means for gating said signals so as to pass substantially coincidentally occurring gated signals from each train, means for deriving from said gated signals, composite signals representing $d_1+S$, $d_1-S$, $d_2+S$ and $d_2-S$, means for delaying said composite signals relatively to one another to cause composite signals derived from one group of coincidentally occurring gated signals to occur in succession before the occurrence of composite signals derived from the next group of coincidentally occurring gated signals, a common amplifier, means for feeding the relatively delayed signals to said common amplifier and means for detecting said signals.

3. In radar apparatus of the simultaneous lobing type, a source of a plurality of trains of radar signals in which each train comprises signals occurring at spaced time intervals with the signals in each train occurring substantially coincidentally with the signals in another train, the signals in one train representing a difference signal $d_1$, the signals in another train representing a difference signal $d_2$, and the signals in another train representing a sum signal S, means for gating said signals so as to pass substantially coincidentally occurring gated signals from each train, means for deriving from said gated signals, composite signals representing $d_1+S$, $d_1-S$, $d_2+S$ and $d_2-S$, means for delaying said composite signals relatively to one another to cause composite signals derived from one group of coincidentally occurring gated signals to occur in succession before the occurrence of composite signals derived from the next group of coincidentally occurring gated signals, a common amplifier and means for feeding the relatively delayed signals to said common amplifier, means for controlling the gain of said amplifier, means for deriving a control signal from the sum of the moduli of the composite signals and means for feeding said control signal to said gain control means to control the gain of said amplifier.

References Cited in the file of this patent
UNITED STATES PATENTS

| | | |
|---|---|---|
| 2,456,666 | Agate et al. | Dec. 21, 1948 |
| 2,489,304 | Marchand | Nov. 29, 1949 |
| 2,509,207 | Busignies | May 30, 1950 |
| 2,721,320 | Sommers | Dec. 18, 1955 |
| 2,830,288 | Dicke | Apr. 8, 1958 |
| 2,873,443 | Raboy | Feb. 10, 1959 |